E. DRAULLETTE.
VARIABLE DIFFERENTIAL SPEED GEAR.
APPLICATION FILED MAR. 7, 1908.
1,015,481.
Patented Jan. 23, 1912.
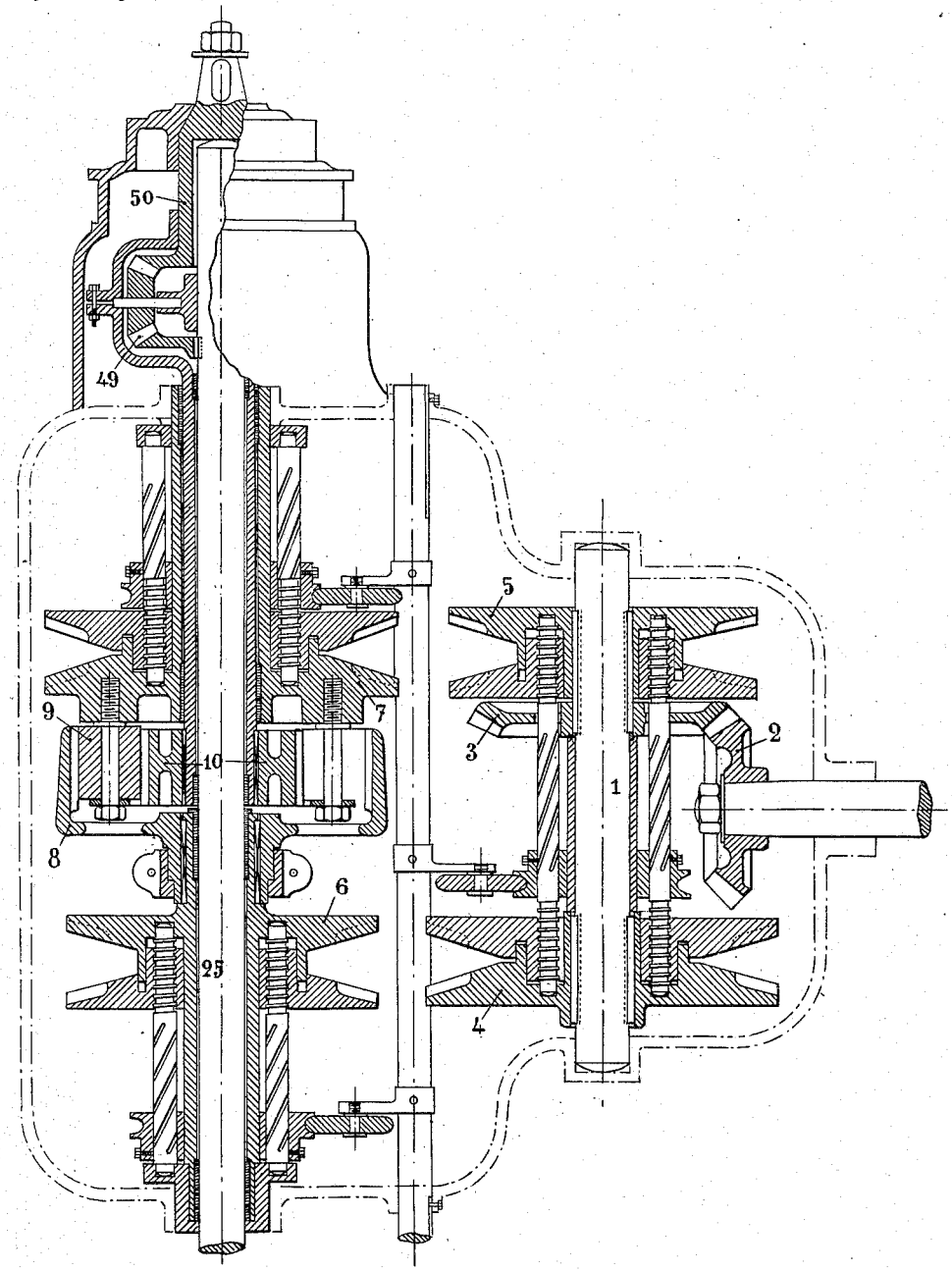
Witnesses.
Inventor.

UNITED STATES PATENT OFFICE.

EDMOND DRAULLETTE, OF PARIS, FRANCE.

VARIABLE DIFFERENTIAL SPEED-GEAR.

1,015,481.  Specification of Letters Patent.  Patented Jan. 23, 1912.

Application filed March 7, 1908. Serial No. 419,826.

*To all whom it may concern:*

Be it known that I, EDMOND DRAULLETTE, a citizen of the French Republic, and resident of Paris, France, have invented new and useful Improvements in Variable Differential Speed-Gear, of which the following is a full, clear, and exact description.

The present invention relates to the improvement in variable speed devices based on the principle of a differential satellite gear.

The description of the invention is given hereinafter with reference to the accompanying drawing, of which the figure represents a section through the apparatus taken through the axis of the main shaft and of the secondary or auxiliary shaft.

The progressive variable speed gear is essentially composed of two principal parts, the speed-combination of which forms the object of the present invention: 1.—A differential gear with straight pinions. 2.—A set of extensible pulleys which serve for the purpose of varying the relative speed of the outer toothed ring and of the satellites.

The main-shaft 1 receives a direct or conveniently reduced motion, as shown by way of example in the drawing, from the angular pinion 2 and through the wheel 3 which is keyed upon the shaft 1. There are further keyed upon said shaft 1 the extensible driving pulleys 4 and 5 to which correspond two other extensible pulleys 6 and 7 actuated by chains, cables or any other suitable means for transmission and revolving in the same direction as the main-shaft. The pulley 6 with the annular part 8, the pulley 7 and the central pinion 10 are keyed upon special sleeves which are loosely mounted upon one and the same shaft 25 which is driven from the central pinion 10.

Supposing the motion originally to start from the position of the wheels represented in the drawings; the large driving pulley 4 operates the small pulley 6 which has, keyed upon its hub, the outer ring 8 of the differential gear; the small driving pulley 5 operates the large pulley 7 which takes along in its revolving motion the satellite pinions 9; and as in the case presented the angular speeds of the satellites 9 and of the ring 8 are unequal owing to the diameters of the driven pulleys; the central pinion 10 will be moved inversely owing to the properties of the differential motion, the diameters of the pulleys corresponding to the result to be attained, upon the inner shaft being determined by calculation.

The position on the drawing is the position of high back speed. When the pulley 6 operated from the pulley 4 augments its diameter, the pulley 7 operated from the pulley 5 will diminish its diameter. The speed of the outer ring 8 will be reduced while the speed of the pinions 9 will increase and the difference of speed of the two parts 8 and 9 from a maximum, which for a motorcar will be the high back speed, for example, will become zero after having passed through such a value that the movement obtained upon the central pinion 10 will be equal to zero and then will gradually increase as a forward motion. Thus for this pinion 10 the following phases are obtained: 1.—High back speed diminishing to zero. 2.—Progressive forward motion up to the desired maximum, obtained when the satellites and the ring will revolve at the same speed, that is to say, when the four pulleys are equal. For obtaining the variation of diameters of corresponding extensible pulleys, that is to say the variation of speed in forward and in backward direction and the stopping of the car, any suitable means operated by hand or foot may be used as well as any suitable device which is automatically actuated by the engine.

The apparatus is applicable in all industries where explosion engines are employed, such as cranes, rolling bridges, tool-engines, lifts, looms etc.

In the drawing the device is shown as specially adapted for a motorcar; the motor being placed at the front end of the frame and connected with the variable speed gear through the shaft which operates the pinion 2. The central pinion 10, by its sleeve operates in the usual manner another differential 49 which transmits the motion to the chain pinions actuating the driving wheels by means of the secondary or driven shaft 25 and the socket 50. The central pinion may also actuate the rear axle of the vehicle without any chains being employed.

What I claim as my invention is:

A variable direction and speed device with epicycloidal differential gearing and extensible pulleys comprising in combination: a main-shaft, two extensible pulleys keyed on the said main-shaft, the driving gear between said pulleys, a secondary shaft, sleeves loosely mounted upon the said shaft;

two other extensible pulleys, a planetary gearing between the last mentioned pulleys and on the secondary shaft, and connecting means between each pair of extensible pulleys, the said planetary gearing being composed of three parts, the annular part connected to one of the pulleys and the satellites connected directly to the fixed cheek of the other extensible pulley, and the central pinion transmitting the movement, whereby the final or transmitted movement may be changed in speed or in direction or caused to cease by varying the relative speeds of the annular part and of the satellites; the said pulleys, annular part and central pinion being keyed upon the said special sleeves loosely mounted upon the secondary shaft which is driven from the central pinion; substantially as described and for the purpose set forth.

EDMOND DRAULLETTE.

Witnesses:
PAUL RUPUY,
LOUIS ALLAIN.